Patented Aug. 14, 1923.

1,465,137

UNITED STATES PATENT OFFICE.

WILFRED F. LANGELIER, OF BERKELEY, CALIFORNIA.

METHOD OF WATER PURIFICATION.

No Drawing.   Application filed February 25, 1920.   Serial No. 361,295.

*To all whom it may concern:*

Be it known that I, WILFRED F. LANGELIER, a citizen of the United States, residing at Berkeley, in the county of Alameda and State of California, have invented a new and useful Improvement in Methods of Water Purification, of which the following is a specification.

This invention relates to a method of clarification, and purification of water, sewage, sewage effluents, trade wastes or other similar liquids.

It is the principal object of the present invention to provide a process of treatment for liquids as above specified and it especially relates to the treatment of liquids usually clarified by the use of a coagulant such as basic sulphate of aluminum, said process bringing about purification and desirable removal of turbidity without requiring the large amount of coagulant, now commonly used and thereby producing a more desirable and economical method of water treatment.

The present invention contemplates the use of a coagulant and a chemical agent which will yield ionic hydrogen when added to water and which coagulant and agent may be separately or collectively added to a water to produce the clarification and purification thereof.

It is common practice in treating water and other liquids when producing clarification and purification that a solution of a substance called filter alum be added to the liquid in a sufficient quantity to react with the alkaline salts normally contained in the water and thus form a precipitate or a coagulum which settles to the bottom of the container and carries down some of the coloring matter and most of the suspended foreign matter. The critical dosage of the coagulant required cannot be accurately predicted in advance and for that reason it is customary to experiment with each condition of water in order to determine the proper dosage.

The present invention contemplates a treatment of liquids in which a minimum dosage of coagulant is used, this dosage being in fact, much smaller than the usual amount of coagulant used and may with certain types of water approximate 50% or less of the amount of basic aluminum sulphate now commonly employed in bringing about the same or inferior results.

The coagulant preferably used in carrying out the present invention as before stated is sulphate of aluminum, or commercially known as filter alum, although other aluminum bearing substances might be used. In connection with this coagulant an acid is added which will react with the liquid or the coagulant solution to yield ionic hydrogen thereby partially or almost completely neutralizing the alkalinity of the liquid and producing a coagulating action superior to the results obtained by the use of aluminum substances alone. This hydrogen yielding substance may be any suitable acid as sulphuric, hydrochloric, or any mixture of acids; or acid salts such as sodium acid sulphate, niter cake or if desirable it may be an acid anhydride such as carbon or sulphur dioxide. The most suitable proportions of coagulant and acid may be determined by experiment.

In treating the water the acid may be first mixed with the alum solution and added to the water as a single solution, or it may be added to the water prior to the addition of the coagulant solution. The water and coagulant solutions are thoroughly mixed preferably by allowing the treated water to pass through a well baffled mixing chamber until a well defined floc is developed after which the water is passed into a settling tank where the floc is permitted to settle to the bottom of the tank and carry down a portion of the coloring matter with practically all of the suspended foreign substance. The water may then, if desired, overflow to a filter and undergo further purification.

In carrying out experiments along the line of the present invention using varying dosages of acid and alum, and also using different acids, one of the tests made was with water having the following characteristics:

Color 65 parts per million, turbidity 145 parts per million, alkalinity 165 parts per million as $CaCO_3$.

This water was treated with a solution of filter alum and normal sulphuric acid. After the water had been agitated for 45 minutes, it was permitted to settle and its characteristics were noted to be as follows:

Color 11 parts per million, turbidity 0, alkalinity 114 parts per million as $CaCO_3$.

In this test the dosage of alum was 33 parts per million, and the dosage of acid 30 parts per million as calcium carbonate. Without the acid nearly two times as much alum was required to effect the same relative improvement.

A large number of similar experiments were made and it was found that mixtures of sulphuric acid and alum containing from 20 to 50 per cent of the sulphuric acid gave results equal to or better than would be obtained by using an equal weight of alum unmixed with the acid.

In the event that it is desired to remove the free $CO_2$ produced by the interaction of the various ions present, it may be removed from the clarified liquid if desired by aeration or by other known methods.

It will thus be seen that by treating water with the chemicals and in the manner described in the foregoing, it is possible to obtain clarification and purification of the solution without requiring excessive doses of coagulant and at the same time providing a cheap and directly acting substitute for the coagulant saved.

While I have shown the preferred manner of carrying out my process of water purification it will be understood that varying types of water and sewage will necessitate variations of the proportional quantities of the neutralizing coagulating agents used and that such changes will not be considered as departing from the spirit of the present invention.

Having thus described my invention what I claim and desire to secure by Letters Patent, is:

1. A method of water or sewage purification comprising adding to the water or sewage a soluble aluminum salt and using an acid material which will yield ionic hydrogen to assist the coagulation and subsequent sedimentation resulting from the added salt.

2. A method of water and sewage purification wherein a solution containing sulphate of aluminum with an excess of free acid is added to the liquid under treatment.

3. A method of water or sewage purification wherein the alkalinity of the liquid under treatment is partially neutralized by acid material which will yield ionic hydrogen and the liquid then caused to react with a soluble aluminum salt to form a coagulant.

4. A method of water or sewage purification, an essential feature of which is the addition thereto of a strongly acid material together with a soluble coagulating salt.

In testimony whereof I have hereunto set my hand in the presence of two subscribing witnesses.

WILFRED F. LANGELIER.

Witnesses:
RALPH HILSCHER,
PAUL S. BURGESS.